(12) United States Patent  (10) Patent No.: US 8,835,798 B2
Rumsby  (45) Date of Patent: Sep. 16, 2014

(54) METHOD AND APPARATUS FOR LASER PROCESSING THE SURFACE OF A DRUM

(75) Inventor: Philip Thomas Rumsby, Bladon (GB)

(73) Assignee: M-Solv Ltd., Oxford (GB)

( * ) Notice: Subject to any disclaimer, the term of this patent is extended or adjusted under 35 U.S.C. 154(b) by 446 days.

(21) Appl. No.: 12/933,541

(22) PCT Filed: Mar. 18, 2009

(86) PCT No.: PCT/GB2009/000709
§ 371 (c)(1),
(2), (4) Date: Oct. 22, 2010

(87) PCT Pub. No.: WO2009/115785
PCT Pub. Date: Sep. 24, 2009

(65) Prior Publication Data
US 2011/0024400 A1  Feb. 3, 2011

(30) Foreign Application Priority Data
Mar. 18, 2008  (GB) .................................. 0804955.3

(51) Int. Cl.
*B23K 26/00* (2014.01)
*B23K 26/08* (2014.01)
*B23K 26/06* (2014.01)
*B23K 26/073* (2006.01)
*B41C 1/05* (2006.01)

(52) U.S. Cl.
CPC ......... *B23K 26/0732* (2013.01); *B23K 26/0656* (2013.01); *B41C 1/05* (2013.01); *B23K 26/0823* (2013.01)
USPC ................................. 219/121.61; 219/121.78

(58) Field of Classification Search
USPC ........... 219/121.6–121.83; 264/400; 438/940; 430/322, 323, 328
See application file for complete search history.

(56) References Cited

U.S. PATENT DOCUMENTS 5,138,675 A * 8/1992 Schofield ........................ 385/28
5,654,125 A * 8/1997 Fan et al. ....................... 430/306
(Continued)

FOREIGN PATENT DOCUMENTS

| JP | 2002-292488 | 10/2002 |
| WO | WO 96/33839 | 10/1996 |
| WO | WO 2007/062130 | 5/2007 |
| WO | WO 2007/135379 | 11/2007 |

OTHER PUBLICATIONS

International Search Report issued in PCT/GB2009/000709 dated Jun. 29, 2009.

*Primary Examiner* — Sang Y Paik
(74) *Attorney, Agent, or Firm* — Ked & Associates, LLP (57) ABSTRACT

An apparatus and method for exposing the surface of a drum to patterned illumination from a pulsed laser source to form a dense, regular array of 3-D microstructures is provided. The method may include locating a mask relative to a target area, projecting a uniform line shaped laser beam through the mask to project an image including a plurality of features of the mask onto the target area, de-magnifying the image, rotating the drum continuously so the surface moves in a first direction perpendicular to the axis of rotation of the drum and simultaneously moving the projected beam in a second direction parallel to the axis of rotation of the drum, tilting the projected array of microstructures to correspond to the helical path followed by the laser beam on the drum surface, and controlling the pulsed laser based on an angular position of the drum.

10 Claims, 4 Drawing Sheets

(56) References Cited

U.S. PATENT DOCUMENTS

| | | | |
|---|---|---|---|
| 6,285,001 B1 * | 9/2001 | Fleming et al. | 219/121.72 |
| 6,462,307 B1 * | 10/2002 | Hennig et al. | 219/121.77 |
| 7,063,999 B2 * | 6/2006 | Tanabe et al. | 438/62 |
| 7,985,941 B2 * | 7/2011 | Corrigan et al. | 219/121.68 |

* cited by examiner

METHOD AND APPARATUS FOR LASER PROCESSING THE SURFACE OF A DRUM

TECHNICAL FIELD

This invention relates to the formation of arrays of 3-D microstructures on the surface of a cylindrical drum by laser ablation.

BACKGROUND ART

Methods for applying microstructures to the surface of cylindrical drums by pulsed laser ablation have been well known for many years. The main application is in the gravure and flexography printing industries where lasers are used to create ink carrying pits so the drums are able to transfer images directly or indirectly onto flat paper or polymer films. The techniques used are very well developed with a wide range of lasers used to create pits directly in metal drums or in drums coated with ceramic, rubber or polymer layers. U.S. Pat. No. 5,327,167 describes a machine for ablating pits of variable density on the surface of a printing drum.

The lasers used are usually focused to spots on the drum surface in the diameter range 10 to 100 μm to create pits by direct laser ablation or by ablation of a thin mask followed by chemical etching. Characteristics of the lasers used are that they have single or low mode beams which are focused to circular spots that have Gaussian energy distribution and are of the diameter required, that they emit sufficient energy per pulse to ablate a pit with a single pulse and that they operate at high repetition rate so they can create pits at high speed in order to process drums with large surface areas in reasonable times. The diameters of the pits formed range from a few 10s to a few 100s of microns, the limits being set at the small end by the capacity to pick up ink and at the large end by the resolution of the printing requirement. Pits of the smallest size are made by individual laser shots from a single mode laser with modest energy per pulse and larger pits, often of hexagonal shape, are made by making many small pits adjacent to each other. Large circular pits are made with a single laser pulse from a laser emitting a beam with several modes with higher energy per pulse.

U.S. Pat. No. 6,462,307 discloses a process to create a pit in a single laser shot that is not circular in shape. In this case the primary laser beam is divided into multiple angularly separated sub-beams that are individually adjusted in power and are recombined with small variations in position on the drum surface to form a non-circular, non-Gaussian distribution of energy on the drum surface. A description of this multi-beam profile modulation technique, as well as a review of other more standard printing drum machining processes is discussed by Hennig et al in the paper "Laser processing in printform fabrication" Photonic Applications Systems Technologies Conference (PhAST), PTuA4, Baltimore, May 8, 2007.

None of these focused beam techniques allows the possibility of creating arbitrarily shaped 3D structures with smooth surfaces on the drum surface. This applies particularly to the situation where micro-lenses or other light controlling structures with dimensions less than a few 10s of microns are to be made. Such structures require the use of mask projection methods The techniques of pulsed laser ablation by mask projection are well known. A mask is illuminated by the beam from a pulsed laser which has passed through optics to reshape it and make it as uniform as possible. A projection lens is used to form a reduced size image of the mask pattern on the surface of a substrate. The lens creates an image of such a size that the energy density of each pulse of laser radiation exceeds the threshold for ablation of the substrate material. The material is ablated at a rate that is usually a fraction of a micron per laser shot and therefore multiple laser shots are needed to create a structure of the required depth. Highly multimode lasers or lasers where the coherence has been reduced are usually used for this mask projection process to avoid interference effects at the image.

It is possible to use these laser ablation mask projection techniques to create 3 dimensional structures in substrates but for these to be of exactly the desired shape it is necessary to change the mask after each laser shot to correspond to the correct contour of the microstructure. Moving a mask is a slow process so ways have been devised to avoid any mask motion yet at the same time create the required 3D structures.

Many examples of this prior art have been disclosed. All use image reduction mask projection systems with static masks that have lines of different features each representing a different contour at different depths in the micro-structure required. The mask features are on a constant pitch and the substrate is moved in the direction parallel to the lines of these features such that every time the laser emits a pulse of radiation the substrate has moved by exactly one or a multiple of the feature pitch distance on the substrate. Because of the requirement to keep the substrate motion exactly in step with the laser firing, this technique can be termed laser pulse synchronized substrate motion (LPSSM).

WO 94/25259 describes a method and apparatus for making arrays of identical through holes of arbitrary shape in polymer films to form thin meshes for medical devices using the LPSSM technique. WO 96/33839 describes a UV excimer laser based LPSSM method and apparatus for making 2 dimensional arrays of identical micro-structures having arbitrary 3D shape on the surface of flat substrates.

Many published articles describe various applications of this LPSSM technique. SPIE Proceedings, Vol 4760, p 281 (2002) names the technique "synchronized image scanning" and shows how it can be used to manufacture ink jet print head plates with extended rows of nozzles with controlled 3D profile. Thin Solid Films, Vol 453-454, p 450 (2004) shows how, as well as linear structures such as ink jet heads, the technique can be used to make arrays of microstructures over large area flat substrates to form masters for subsequent replication. SPIE Proceedings, Vol 5339, p 118 (2004) shows an example of an apparatus that is used to make large area masters for micro-lens arrays on flat plastic substrates by LPSSM. This article raises the issue of problems associated with visible seam artefact defects that occur at the boundary lines between process bands on large area substrates.

WO 2007/135379 A2 introduces new LPSSM methods to overcome visible seam defects on large area flat substrates. This prior art also incorporates halftone edge features into the mask structures in order to eliminate surface discontinuities on the laser ablated microstructures caused by the sharp edges on binary masks.

A key feature of the LPSSM prior art discussed is that in all cases the substrates used have been flat. Precision motion of flat substrates is not a problem for the situation where small devices such as ink jet print heads or medical mesh filters are made by LPSSM since stage travel requirements are small. On the other hand, for the case of the large flat substrates used to make masters for light control and micro-lens array film replication, controlled motion of the substrate becomes a major issue since the manufacture of such devices by LPSSM requires sub micron resolution and micron accuracy over distances in 2 dimensions far exceeding one meter.

For this major application of LPSSM the use of a flat master is not ideal since most industrial high volume film replication production lines use drums to transfer the microstructure to the film. Conversion of a flat master into a cylindrical tool involves many intermediate steps and gives rise to a drum with a linear seam so replicated parts are limited in length to the circumference of the drum. Hence, there remains a need to be able to create precision arrays of 3D microstructures directly on the outside of cylindrical drums.

Visible band interface defects are not an issue when using LPSSM for the manufacture of linear devices such as inkjet print heads or non optical films such as medical meshes. They are however a serious problem when LPSSM methods have been used to make the large masters required for light control and micro-lens array film replication. There is, therefore, a major requirement to devise a method that allows the manufacture of visibly seamless arrays over areas up to several square meters.

Up to now all LPSSM techniques for the manufacture of masters for optical devices have used excimer lasers. These use a mixture of active and buffer gases as the gain medium. Process times for the largest area masters may take many hours over which time the active component in the gas mixture becomes depleted and replacement gas injections are periodically needed. During each injection cycle many of the excimer laser properties such as beam profile, divergence, pulse length, etc change and so the continuous accurate control of the ablation process at the substrate surface is very difficult. Visible discontinuities often arise on the substrate surface when excimer laser operation is interrupted for gas management activities and may also appear during operation due to gas fill degradation. Hence, there is a need, in the case where masters for optical devices are manufactured and where process times are very long, to use alternative lasers that operate with a much higher level of stability.

The present invention addresses the issues discussed above that limit the use of LPSSM for the manufacture of masters for the replication of light control and micro-lens array films.

DISCLOSURE OF INVENTION

According to a first aspect of the invention there is provided a method for exposing the surface of a cylindrical drum in a continuous helical path to illumination from a pulsed laser source to cause ablation of the surface so as to form an array of repeating 3D microstructures thereon, comprising the steps of:

generating pulses of radiation by means of a laser;
providing a mask of rectangular shape with a first axis and a second axis; the mask having a plurality of features on a fixed pitch in a line parallel to the first axis thereof corresponding or proportional to the pitch of the 3D microstructures to be formed, the features in the line corresponding to different depth contours of the 3D microstructure which together define a complete microstructure;
locating the mask relative to a projection lens with the first axis thereof substantially parallel to the axis of rotation of the drum and the second axis thereof substantially parallel to the direction of rotation of the drum;
exposing the mask to the rectangular shaped laser beam such that all the features thereof are exposed by the laser beam;
projecting an image comprising the plurality of features on the mask through the projection lens onto a target area of the drum surface;
rotating the drum about its axis;
moving the projection lens and mask with respect to the drum in a direction substantially parallel to the axis of rotation thereof such that after each complete rotation of the drum the projection lens and mask have moved a distance equal to said fixed pitch of the microstructure array in the direction parallel to the axis of rotation of the drum whereby said plurality of features are successively exposed onto the same target area to form the different depth profiles of the microstructure; and controlling the timing of the laser pulses in relation to the angular position of the rotating drum such that laser pulses occur whenever the target area on the drum surface has moved a distance corresponding to a repeat distance of the array of microstructures in the direction of rotation such that a whole number of the microstructure repeat distances fit into a helical path around the drum in each revolution thereof.

According to a second aspect of the invention, there is provided apparatus for ablating the surface of a rotating, cylindrical drum to form an array of repeating 3D microstructures thereon comprising:

a pulsed laser source;
a mask comprising a plurality of features in a line on a fixed pitch, the features in the line corresponding to different depth contours of the 3D microstructure;
an illumination system for providing a rectangular shaped laser beam for exposing the line of features on the mask;
an optical projection system for projecting an image of the mask onto a target area of the drum surface;
rotation means for rotating the drum about its axis;
a stage and motor system for moving the optical projection system and mask in a direction parallel to the axis of rotation of the drum such that after each complete revolution of the drum the projection system and mask have moved a distance equal to said fixed pitch of the microstructure array; and
a control system for controlling the timing of the laser pulses in relation to the angular position of the drum such that laser pulses occur whenever the target area on the drum surface has moved a distance corresponding to a repeat distance of the array of microstructures in the direction of rotation.

A novel form of LPSSM that allows the reliable, continuous formation of seamless, microstructures on the surface of drums is thus provided.

The basis of the invention is thus a continuously rotating drum combined with a continuously linearly moving optical mask projection system that together are used to create a helical line of microstructures by laser ablation on the surface of a rotating drum. The mask has a rectangular shape and on the long axis it contains one or two lines of features on a fixed pitch corresponding to the pitch of the microstructures in that direction. The features in each line correspond to different depth contours of the 3D microstructures and all the features defining one complete microstructure are included in one line on the mask in that direction. On the short axis the mask contains a sufficient number of features to correspond to the minimum single repeat pitch of the microstructure array in that direction. As each line of features in the long axis on the mask contains all the different depth contours of a single microstructure, as each point on the drum surface is successively exposed to each of the different features in the line image, a fully formed microstructure is formed at that point.

A novel form of LPSSM that allows the reliable, continuous formation of seamless, microstructures on the surface of drums is thus provided.

The rectangular image on the drum surface can be oriented in two ways. In one case, the long axis is oriented to be parallel to the drum axis. In the other case, the long axis is oriented to be perpendicular to the drum axis (ie disposed around the circumference of the drum). In both cases, the rectangular image moves by one microstructure repeat pitch parallel to the drum axis during each drum rotation. In the parallel, case each point on the drum surface is exposed to only a single microstructure feature for each revolution of the drum. As the image is advanced along the drum surface, each point is exposed progressively to all the image features and complete circumferential lines of microstructures are completed only after the full length of the image has passed over the surface. In the perpendicular case, a point on the drum surface is exposed to the complete series of microstructure features in a single pass of the image over the surface so creating one row of complete microstructures in the case of a square or rectangular packed array or two rows in the case of a hexagonally packed array.

The method disclosed can be used to create seamless arrays of individually symmetric or asymmetric repeating microstructures with arbitrary packing density. Preferred features of this method are now described starting with the requirements for the beam size at the surface of the substrate.

One important feature is that each microstructure element is completely processed and fully formed after a complete pass by the moving drum surface under the full image of the mask. This is accomplished in practice by using an image that includes all the different mask features needed to machine the required structure shape and depth. The length of this line image at the drum surface depends on the size of each microstructure element and the number of different contour levels needed. For high accuracy structuring, masks defining contours at about 0.1 to 0.2 µm depth intervals are needed. As an example, for a square array of 25 µm deep microstructures with 50 µm pitch, at least 125 different mask structures are needed to define the shape accurately so the minimum image length at the drum is 6.25 mm.

For a fixed microstructure depth to size ratio and for a given material and ablation rate, the length of the image required is proportional to the square of the pitch. This means that for large microstructures image lengths can be very long and for small microstructures image lengths can be very small. For a depth that is half the pitch and an ablation rate of 0.2 µm per shot, the image lengths for 10 µm and 100 µm pitch features are 0.25 mm and 25 mm respectively.

A major problem that has been encountered previously with LPSSM for 3D optical microstructure master formation is the stitching errors that occur between adjacent scan bands. Such errors manifest themselves as visible lines on the substrate on a pitch equivalent to the width of the band scanned. For concave microstructures where little or no material is ablated at the edge of the image field, these are usually caused by the deposition of debris ablated from an area within the beam landing on a surface yet to be exposed. For convex structures, however, where material is ablated to the full depth of the micro-structure, at the image field edge the visible lines are due to ridges caused by the inward slope to the wall.

Hence, another important feature is that, due to the combined motion of the drum and the moving optics, lines of microstructures are formed in the form of a very fine helix with each circumferential line of completed microstructures being formed after one rotation of the drum. Continuous movement of the drum with the optics advanced along the drum length by one microstructure repeat pitch each revolution enables visible band interface artefacts to be eliminated as even if debris or ridge effects occur they are on the same pitch as the smallest structure and therefore are not seen as a defect. Hence, for the two cases considered above, where 10 µm or 100 µm pitch microstructures with depth half the pitch are to be formed, the image shapes at the substrate surface for the case of a square array are 0.25 mm long×0.01 mm wide and 25 mm long×0.1 mm wide, respectively. For the case of hexagonally shaped and packed microstructure arrays with 10 µm or 100 µm pitch between structure centres, the image will contain two parallel rows of features with half pitch offset running in the long axis and the width of the image will increase by a factor of 1.866 to give image shapes of 0.25 mm long×0.01866 mm wide and 25 mm long×0.1866 mm wide, respectively. From these examples it can be seen that in all cases the aspect ratio, or length to width ratio, of the line beam at the substrate is expected to be large.

Another important feature is that the pulsed laser beam used for image formation on the drum surface by the optical mask projection system must have a sufficient number of transverse modes so that it can be regarded as having a very low level of spatial coherence so there are no significant interference effects at the image plane. Lasers that emit multimode, low coherence, beams directly are very well known. An example of such a low coherence laser is the excimer gas laser that usually emits pulses with 10s of nanosecond duration at repetition rates up to 1 kHz and operates in the UV region. Another example is the multimode, solid state laser that emits pulses with durations usually in the range 10 to 100 ns at repetition rates up to several 10 kHz and usually operates at a wavelength at or close to 1.064 µm. Such UV excimer lasers can be used very widely for ablation of materials since most materials absorb strongly in the UV. Multimode solid state lasers can be used directly to ablate materials that absorb strongly at the IR laser wavelength or alternatively can be converted to shorter wavelengths using non-linear crystals. Multimode solid state lasers operating in the visible region at 532 nm and in the UV at 355 nm are readily available. The latter type of laser is particularly useful for the invention described here as many organic and inorganic materials absorb strongly at 355 nm.

The multimode lasers discussed above can all be used directly without further efforts to reduce beam coherence. However, in many cases, it is desirable to use lasers that emit beams with a single or very limited number of spatial beam modes so having a much higher level of coherence. Such lasers are based on solid state active materials and usually operate at repetition rates up to several 100 kHz with pulse lengths in the 10s of ns range at fundamental wavelengths around 1.06 µm with harmonics in the visible and UV regions down to 266 nm. In the case of these lasers, it is necessary to pass the laser beam through a "mode scrambler" device to reduce the coherence level. Mode scrambler devices, based on propagating the laser beam down a multimode optical fibre, have been described extensively and are commercially available. Devices have been demonstrated that use fused silica, low loss optical fibres and which operate with laser pulses of high intensity and in the UV region. U.S. Pat. No. 5,138,675 discloses a fibre based mode scrambler used as a key part of an optical isolator in a local area network. A review of the use of mode scramblers as developed for high pulse energy laser particle image velocimetry is given in Robinson and Ilev, Review of Scientific Instruments, Vol 75, p 4856, November 2004. The FM-1 is a commercial mode scrambler that is available from Newport Corporation.

Another important feature is that the beam from the laser is reshaped to form a long, narrow, uniform line beam at the mask as discussed above. This is accomplished using standard optical homogenization units based on lens arrays or diffractive optical elements. With such devices the beams from low coherence, multimode lasers or from high coherence, low mode lasers that have been passed through a mode scrambler can be readily reshaped, made to be more uniform and adjusted in divergence in order to match the requirements of the projection optics. Due to the high aspect ratio of the mask pattern, a high degree of energy density uniformity is essential in the long axis of the line beam but is desirable but not so critical in the short axis. In the short axis direction the mask pattern is sufficiently narrow that over filling of the pattern by a Gaussian distribution of energy density is likely to be inefficient but satisfactory. A superior solution in terms of efficiency and uniformity is to create a quasi-Gaussian distribution with a flattened top. Such methods are well known to those experienced in the art of laser beam manipulation and modification.

Another important feature is that only a single mask projection unit with a single laser beam is used to irradiate the drum surface. This arrangement is consistent with the use of a single laser unit being used to generate the laser radiation and is likely to be the most convenient arrangement. However, it may be desirable in cases where higher laser power or higher laser repetition rate are required that more than one laser source is used. In this case it is necessary to combine the beams from the separate source lasers before entering the homogenizer and beam shaping unit prior to entering the mask projector. The combination of two orthogonally polarized lasers using polarizing mirrors is well known. The spatial combination of two or more lasers at the entrance aperture of a lens array homogenizer is also known. Mode scramblers can also be used to combine multiple laser beams. Beams can be combined such that the pulses overlap in time and create a higher energy on each pulse or alternatively the pulse trains can be interleaved so that the effective repetition rate is increased.

Another important feature is that the rectangularly shaped beam is used to illuminate the surface of a rectangular mask which on the long axis contains one or two lines of features on a fixed pitch corresponding to the pitch of the microstructures in that direction. The features in each line correspond to different depth contours of the 3D microstructures and all the features defining one complete microstructure are included in one line on the mask in that direction. On the short axis the mask contains a sufficient number of features to correspond to the minimum single repeat pitch of the microstructure array in that direction. As each point on the drum surface becomes exposed to each of the different features in one of the lines of features, a fully formed 3D microstructure is formed at that point. Such masks are sometimes made of metal but for high accuracy reproduction of fine scale microstructures it is more usual to use patterned chrome on quartz. The technology of making and using such masks is well known.

Another important feature is that a projection lens is used to create a reduced image of the mask pattern on the drum surface. The lens needs to be of the reducing type in order to give a laser pulse energy density on the drum surface that is high enough to ablate material while retaining a low enough energy density at the mask to avoid any damage to the mask. Depending on the drum material to be ablated and the mask material, lens demagnification factors in the range 5 to 20 are generally used. Another key requirement of the lenses used is that they have to have adequate optical resolution to create accurate structures of the size required on the drum surface. The optical resolution of the lens scales with the laser wavelength and inversely with the lens numerical aperture and hence for the smallest structures the shortest wavelength laser and the highest possible numerical aperture lens should be used. In practice, lenses with numerical aperture in the range 0.1 to 0.3 are typically used. In order to maintain the pitch of the features in the image on the drum surface constant, even if the distance between the drum surface and the lens changes, it is desirable to use a lens of telecentric type.

The apparatus used for carrying out the method described is arranged such that the drum to be processed is mounted on bearings so that it can rotate freely about an axis of rotation which is co-incident with the axis of symmetry of the drum. The drum is rotated by a motor with servo control from a precision rotary encoder attached to the drum axle. The mask and projection lens are accurately placed on the optical axis of the projection system which is arranged to be perpendicular to the drum rotation axis and to pass through the axis of drum rotation so that the laser beam striking the drum surface is perpendicular to the surface in both axes. The lens and mask are fixed in position with respect to each other to maintain an image of constant size at all times during drum processing. The lens and mask are both attached to a carriage that can move on servo motor driven stages in 2 orthogonal axes. The primary stage axis is parallel to the drum axis and hence movement of the lens and mask together along this axis is used to move the image of the mask over the full length of the drum. The secondary stage axis is parallel to the projection system optical axis and hence movement of the lens and mask together along this axis is used to accurately focus the mask image on the drum surface.

Most laser beam homogenizer systems have a well defined output plane at which the beam has the desired shape and uniformity. The mask of the projection system is preferably located at this plane. This plane occurs at a specific distance from the homogenizer so that in order for this plane to be coincident with the mask during the movement of the projection optics on its carriage over the length of the drum, it is desirable that the homogenizer unit is also mounted on the same carriage.

The above comments define the relative orientations of the drum and projection system axes but do not define the absolute axis directions. A horizontal drum axis is commonly used in the range of laser tools available for printing drum engraving and so it is envisaged that a convenient orientation for any practical apparatus used to carry out the method will have the drum axis lying in the horizontal plane. This arrangement allows the optical axis of the projector unit to be at any angle between vertical or horizontal. A horizontal or vertical arrangement is most likely. With this horizontal drum arrangement, the relative motion of the optical system and the drum in the direction parallel to the drum axis can be achieved in two ways. Either the drum is fixed and the optics move parallel to the drum axis or, alternatively, the optics are fixed and the drum is mounted on a stage that allows it to move over its full length. A horizontal drum axis is not the only drum orientation possible and an arrangement where the drum axis is vertical can also be envisaged. In this case, the optical axis of the projection system will lie in the horizontal plane.

A fundamental feature of the method described is that the microstructures are formed on the drum surface in one continuous helical motion. This is achieved by rotating the drum continuously about its axis of rotation while at the same time moving the image of the mask continuously along the length of the drum. There are three important points associated with this co-ordinated motion. One is that after every complete rotation of the drum, the image of the mask has moved along the drum axis direction by one repeat unit pitch length of the microstructure array in the direction parallel to the drum axis. The second point is that the encoder on the drum rotation axis is used to control the firing of the laser such that laser pulses are fired at intervals corresponding to a movement of the drum surface that is very close to the repeat pitch unit of the microstructure array in the direction perpendicular to the drum axis. The third point is that the laser firing is arranged so that an exact number of complete microstructure repeat units fit into each complete circumferential path of the drum surface so that microstructures on adjacent circumferential lines match exactly to form an accurate array.

A consequence of the helical nature of the process is that the lines of microstructures on the drum surface are slightly tilted with respect to the drum axis and hence the line beam image on the surface of the drum is also very slightly tilted with respect to either of the directions perpendicular or parallel to the drum axis in order to match the helical pitch of the pattern. The helical tilt angle is very small as it corresponds to a single microstructure pitch along the drum divided by the drum circumference. For a 300 mm diameter drum and 10 μm and 100 μm microstructure pitches the tilt angles are only 10.61 μrads)(0.000605° and 0.1061 mrads) (0.00605°), respectively.

A consequence of the requirement to fit an integral number of complete microstructures into each revolution of the drum, and hence to exactly match microstructures on adjacent lines of the helical path, is that the triggering of the laser has to be accurately controlled from the rotary encoder on the drum axis so that an exact number of laser pulses are fired in each complete drum rotation. In reality, because of the helical trajectory of the image path on the drum, the distance into which the exact number of pulses has to be fitted is very slightly longer than one revolution. This extra distance on each revolution is small but as it accumulates along the drum length it needs to be accommodated in order to create an accurate 2D array over the whole drum surface. For example, for the case of a drum of 300 mm diameter the length of one complete true circumference around the drum is 942.477795 mm. The additional distance associated with the helical path is given by the product of the microstructure pitch and the helical tilt angle. For the case of 100 μm and 10 μm pitch square array microstructures, the extra distances on each revolution are 10 nm and 0.1 nm respectively. These small extra distances around the drum surface accumulate over the multiple rotations needed to process the full drum to give a total extra distance equal to one microstructure pitch.

The requirement to fit an integer number of pulses into each helical path followed on each drum revolution means that there can be a small discrepancy between the distance the surface of the drum moves between laser pulses and the exact microstructure pitch in the movement direction. As an example, in the case of a 300 mm diameter drum onto which square packed 100 μm pitch microstructures are to be machined, triggering the laser every time the drum surface has moved exactly 100 μm will lead to an error of 22.215 μm in the placement of microstructures on one circumferential helical track with respect to those on an adjacent track. For 10 μm microstructures the error is 2.205 μm. To avoid these errors laser triggering is adjusted to ensure pulses exactly match the circumferential path of each helical track. For the 100 μm microstructure case, this means that 9425 pulses are fired in each drum rotation which corresponds to a shrinking of each structure by 2.357 nm. For the case of 10 μm pitch microstructures, 94248 pulses are fired in one revolution leading to an error over each structure of only 23.3 μm.

Such circumference matching errors are insignificant so long as the line beam image is aligned in the direction parallel to the drum axis but for the case where the line image is aligned perpendicular to this these errors can accumulate over the length of the image and may become important. Several other significant drum curvature related errors arise when the line image is arranged to be perpendicular to the drum axis. These errors are discussed below.

For the case of a 300 mm diameter drum with 100 μm pitch, 50 μm deep microstructures, about 250 mask features are needed in the line beam on the surface and the circumference matching errors discussed above lead to an error of about +/−0.3 μm at each end of the image. This is negligible compared to the 100 μm structure size and does not affect the quality and accuracy of the laser formation process. For the case of 200 μm pitch, 100 μm deep microstructures, however, 500 mask features are needed and the beam length becomes 100 mm. In this case, 4712 pulses are fired in one revolution leading to errors at each end of the image of about +/−2.5 μm which is starting to become significant.

Where the image line is aligned with the drum surface motion the curvature of the drum surface with respect to the depth of focus of the projection lens sets another, more stringent limit. For a given wavelength, the lens depth of focus scales as the square of the optical resolution which means that it also scales as the square of the microstructure size. The sag of the line image on the curved drum surface scales as the square of the line length divided by the drum diameter. For accurate image formation on the drum surface, the sag needs to be less than the depth of focus. This condition places a limit on the maximum microstructure size and depth that can be formed by this drum machining method with the image aligned perpendicular to the drum axis. For the specific case of a UV laser with a wavelength of 355 nm, machining microstructures with sizes of 10 and 100 μm with optical resolution of one tenth of the feature size on the surface of a drum of 300 mm diameter, the maximum image lengths allowed before the sag exceeds the depth of focus are 2.4 and 24 mm, respectively.

Such image line length limits associated with the drum curvature dictate the maximum number of microstructure contour features that can be accommodated on the mask and hence dictate the maximum-microstructure depth allowable. For the cases of 10 μm and 100 μm, features with lengths of 2.4 mm and 24 mm, respectively, set by the depth of focus limitation, the maximum number of mask features is 240 in both cases. For 10 μm microstructures, with a depth of 75% of the lateral size and an ablation rate of 0.1 μm per laser pulse, only 75 mask features in total are required so the requirement that the sag due to drum curvature is less than the depth of focus is not a limit. For 100 μm microstructures, however, even with a higher ablation rate of 0.2 μm per laser pulse, the 240 mask contours limit the depth to less than 50% of the size. For 200 μm microstructures, the image length is limited to 47 mm and the number of mask contours limited to 135 and the depth to 13.5% of the size.

A further problem arises due to the drum curvature when the line image is aligned along the surface motion direction. This is due to the linear distortion of the line image that arises when the flat image generated by the lens is projected onto the curved surface of the drum. For 100 μm microstructures with 50 μm depth, at least 250 mask contours are needed and the image line length is 25 mm. If a line image of this length is projected onto the surface of a drum with a diameter of 300 mm, the image is extended by almost 30 μm so that features at each end of the line are displaced by 15 μm which is sufficient to cause significant loss of shape accuracy in the microstructures formed.

Hence, it can be clearly seen from the above that, unless the microstructures are small and shallow, the laser processing method described herein is best performed with the line image aligned to be parallel to the drum axis. This is therefore the preferred method of carrying out the processes described herein.

To create highly repeatable microstructures over the complete drum surface, it is necessary to ensure that the mask projection system remains in focus on the drum surface at all times. Manufacture of large drums with perfect circularity and concentricity is likely to be difficult so it is likely that the separation between the drum surface and the lens will change during processing. For large microstructures where the lens numerical aperture is low and the depth of focus long, it is likely that the image can be maintained in focus on the drum surface without adjustment during processing. For very small microstructures, however, where the lens numerical aperture is high and the corresponding depth of focus small, some form of auto focusing system is necessary.

Many forms of laser ablation auto focus system exist and can be used but for the present drum process method a system based on an optical drum surface height sensor is preferred. The optical height sensor is attached to the carriage upon which the optical projection system is mounted so it can move along the length of the drum during processing. The point of measurement of the sensor is angularly displaced with respect to the projection system axis in the direction that locates it at a point on the surface that is about to pass before the projection system. The surface height reference signal is processed and the information fed back to a control system driving the servo motor on the stage that moves the projection system along its optical axis in order to maintain the focus.

To ensure a high level of accuracy of placement of all microstructures over the full drum surface, it is necessary to compensate for errors in all three stages that are used to move the drum surface with respect to the optical projection system. Errors in the linear stage that moves the projection system along its optical axis, in the Z direction, normal to the drum surface for focus control are unlikely to be significant since the total travel is likely to be at most 1 or 2 mm. Microstructure placement errors around the drum circumference, in the X direction, due to drum diameter variations and to changes in the speed of drum rotation are fully compensated by triggering the laser from the precision rotary encoder attached to the drum axle. The stage that can cause most significant errors to arise in the placement of microstructures on the drum surface is the linear stage that is used to cause the relative movement of the drum with respect to the projection system in the Y direction parallel to the drum axis. This stage can move either the projection optics or the drum carriage but in both cases will have a range of errors that will give rise to displacements from the desired position of the image created by the projection system on the drum surface in all three axes. Calibration of the stage travel in all 3 axes will give data that allows the errors to be fully corrected. Errors arising in the Z direction perpendicular to the drum surface are corrected by the auto focus system discussed above which moves the projection system along its optic axis to maintain the focal distance. Errors arising in the Y direction parallel to the drum axis direction can be compensated by applying suitable corrections to the linear motion of the Y stage. Errors arising in the X direction around the drum circumference, however, cannot be corrected by motion of an alternative axis. Instead, these errors are compensated by control of the timing of the trigger pulses that fire the laser. Variation in trigger pulse timing has the effect of placing structures at a different X location on the drum surface. Such a method for correction for the X direction circumferential errors induced by motion of the Y stage is valid so long as these errors are small.

The laser pulse energy, repetition rate and power requirements can vary considerably depending on drum surface material and microstructure size and depth. For microstructures with similar depth to size ratio, the area of the beam at the drum surface scales as the cube of the size. Hence, for drum surface materials that require the same ablation energy density, the energy contained in each laser pulse scales as the cube of the microstructure size. The requirement that the laser fires every time the drum surface has moved by one microstructure pitch leads to a laser repetition rate that varies inversely with microstructure size for a given drum surface speed.

As examples, 10 µm and 100 µm pitch microstructures with depths that are half the pitch and with square packing will be considered. If the material is a polymer and the laser is operating in the UV region, an ablation rate of 0.2 µm per shot is achievable at an energy density of about 3 mJ/mm2. In this case, the beam lengths are 0.25 mm and 25 mm respectively while the beam areas are 0.0025 mm2 and 2.5 mm2 and the pulse energies are 7.5 µJ and 7.5 mJ, respectively. For a 300 mm diameter drum rotating at a rate of one revolution per second, the surface speed is 0.9426 m/sec and the laser repetition rates for the 10 µm and 100 µm microstructures are 94.26 kHz and 9.426 kHz, respectively. From these numbers, the laser power requirements at the drum surface can be calculated to be 0.707 W and 70.7 W, respectively. For a drum that is one meter long, the laser process times can be calculated to be 28 and 2.8 hours, respectively.

For the case of hexagonally packed microstructures with 10 µm and 100 µm pitch with depths that are half the pitch, the beam lengths and widths are 0.25 mm and 0.01866 mm and 25 mm and 0.1866 mm, respectively while the beam areas are 0.00467 mm2 and 4.67 mm2 and for 3 mJ/cm2 energy density the pulse energies are 14 µJ and 14 mJ, respectively. For a 300 mm diameter drum rotating at a rate of one half revolution per second, the laser repetition rates are 47.1 kHz and 4.71 kHz giving laser power requirements at the drum surface of 0.66 W and 66 W, respectively. For a drum that is one meter long, the laser process times can be calculated to be 30 and 3 hours respectively.

BRIEF DESCRIPTION OF DRAWINGS

Aspects of the method and apparatus will now be described with reference to the accompanying drawings of which.

DETAILED DESCRIPTION OF DRAWINGS

FIG. 1

Figure 1:
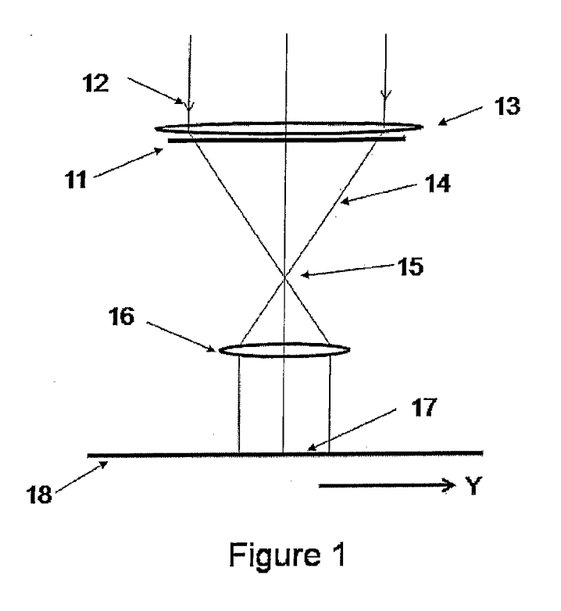
FIG. 1 shows a schematic view of apparatus for laser mask projection according to an embodiment of the invention.

FIG. 1 is a simple picture, that illustrates the key elements of an optical mask projection system using a telecentric lens. A mask 11 is illuminated by the beam from a laser 12. A field lens 13 before the mask 11 focuses the laser radiation 14 transmitted by the mask 11 at the lens entrance pupil 15. The projection lens 16 creates an image 17 of the pattern on the mask 11 on the surface of a substrate 18. When such an optical projection system is used for LPSSM, the mask is held stationary with respect to the lens 16 and laser beam 14 but the substrate 18 is moved continuously in one direction Y as shown.

FIG. 2

Figure 2:
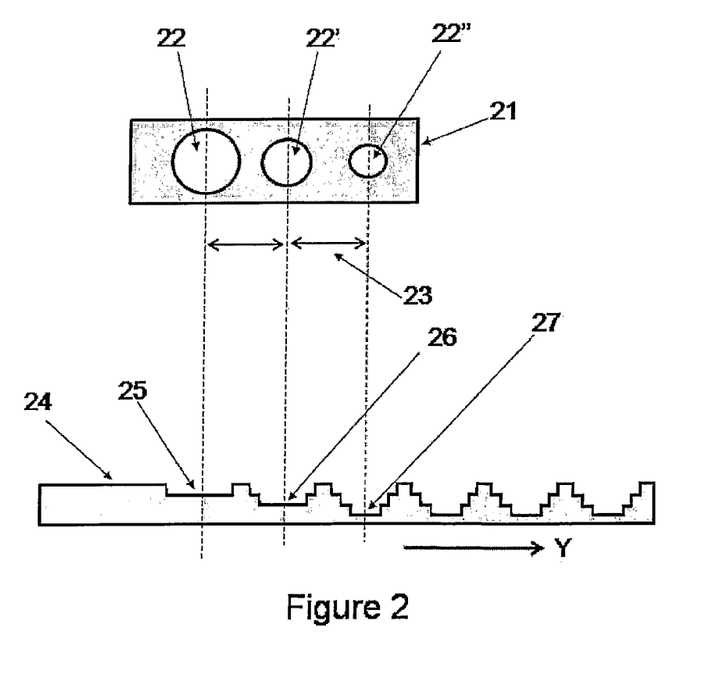
FIG. 2 illustrates the principles of laser pulse synchronized substrate motion to form the different depth profiles of a microstructure.

FIG. 2 illustrates the principle of LPSSM in a simple diagrammatic way showing only the mask and substrate of an optical projection system of the type shown in FIG. 1. The mask 21 has features 22, 22', 22" that are simple circular apertures of different diameter located on a fixed pitch 23. When a laser pulse illuminates all three of the apertures in the mask 21 the projection system creates an image of the three apertures on the surface of a substrate 24. Three structures, corresponding to the apertures in the mask 21, are ablated into the surface of the substrate 24. The substrate 24 is moved continuously in the Y direction, which is aligned with the row of apertures in the image on the substrate 24. The laser pulses are fired every time the substrate 24 has moved a distance equal to one pitch of the aperture images on the substrate 24. By this method, the images from each of the three different apertures in the mask 21 are caused to overlap on the substrate 24 building up a 3D structure corresponding to the three apertures 22, 22', 22". The substrate 24 is moving from left to right in the figure in the Y direction and hence the first contour of the structure is ablated into the substrate as it moves into a position 25 corresponding to the image of the first aperture 22. As the substrate moves to the position 26 corresponding to the next aperture 22' the second contour of the structure is ablated on top of the first contour. As the substrate moves to the position 27 corresponding to the third aperture 22", the final contour is ablated to form the complete microstructure. Completed microstructures pass out of the beam to the right in the figure as the substrate moves in the Y direction.

FIG. 3

Figure 3:
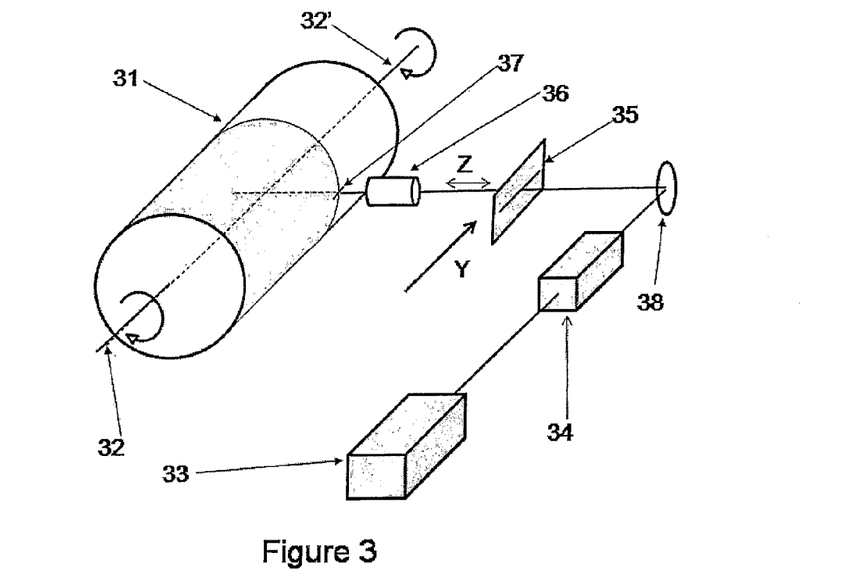
FIG. 3 shows a schematic view of apparatus for laser processing on a drum according to an embodiment of the invention.

FIG. 3 shows the details of an apparatus that can be used to carry out the drum patterning method disclosed. A cylindrical drum 31 is mounted on an axis 32, 32' and caused to rotate continuously about this axis by means of a servo motor system which is not shown in the figure. A laser unit 33 generates a pulsed laser beam which enters an optical homogenizer unit 34. The laser 33, in this case, is of the multimode type with a sufficient number of modes in the beam to be regarded as incoherent so that a mode scrambler is unnecessary. The homogenizer unit 34 transforms the beam from the laser 33 into a rectangular line beam with improved energy density uniformity at the surface of a mask 35. A projection lens 36 creates a reduced image 37 of the line pattern on the mask 35 on the surface of the rotating drum 31. In the figure, the line image is aligned to be close to, but not exactly, parallel to the axis 32 of rotation of the drum 31. Alignment of the line image perpendicular to the drum axis 32 is also possible. The optical axis of the beam from the lens 36 is aligned to pass exactly through the drum axis 32 of rotation and to be normal to the drum axis 32 so that the image of the mask on the drum surface is exactly normal to the surface. The lens 36, mask 35 and homogenizer 34 are all mounted on a carriage (not shown) on a servo motor driven stage that is aligned to be parallel to the drum axis 32 of rotation to allow passage of the whole optical assembly along the full length of the drum 31 in the direction Y. During laser processing, the drum 31 is rotated continuously and the carriage carrying the optical projection and homogenization units is moved continuously from one end of the drum 31 to the other such that the image of the mask 35 maps out a continuous helical path over the full drum surface. The figure also shows a mirror 38 that is used to deviate the beam from the homogenizer 34 onto the mask 35. This arrangement is shown in order to make a more compact optical layout but in practice mirrors can be placed in alternative locations in the optical system or even omitted altogether. In the arrangement shown, the laser 33 is stationary with respect to the moving homogenizer 34 and optical projection system so that the distance from it to the homogenizer 34 varies as drum 31 processing proceeds. Depending on the laser beam properties, it may be desirable to move the laser 33 with the homogenizer 34 to maintain a constant separation. In this case, the laser 33 is also mounted on the moving carriage with the homogenizer 34 and projection optics. An alternative way of solving this problem is to keep the complete optical system fixed in the direction parallel to the drum axis 32 and instead mount the drum 31 on a linear stage system (not shown) that moves it over its full length. In the case shown in the figure, where line image is aligned along the drum axis direction in order for all points on the drum surface to be exposed to all features in the image, it is necessary for surface processing to start with the full length of the line image displaced beyond the start edge of the drum process area and for processing to continue over the full drum length until the full length of the line image has passed the finish point of the drum process area. The consequence of this is that the distance travelled by the projection system with respect to the drum 31 in the direction parallel to the drum axis 32 is equal to the drum process length plus the image length.

FIG. 4

Figure 4:
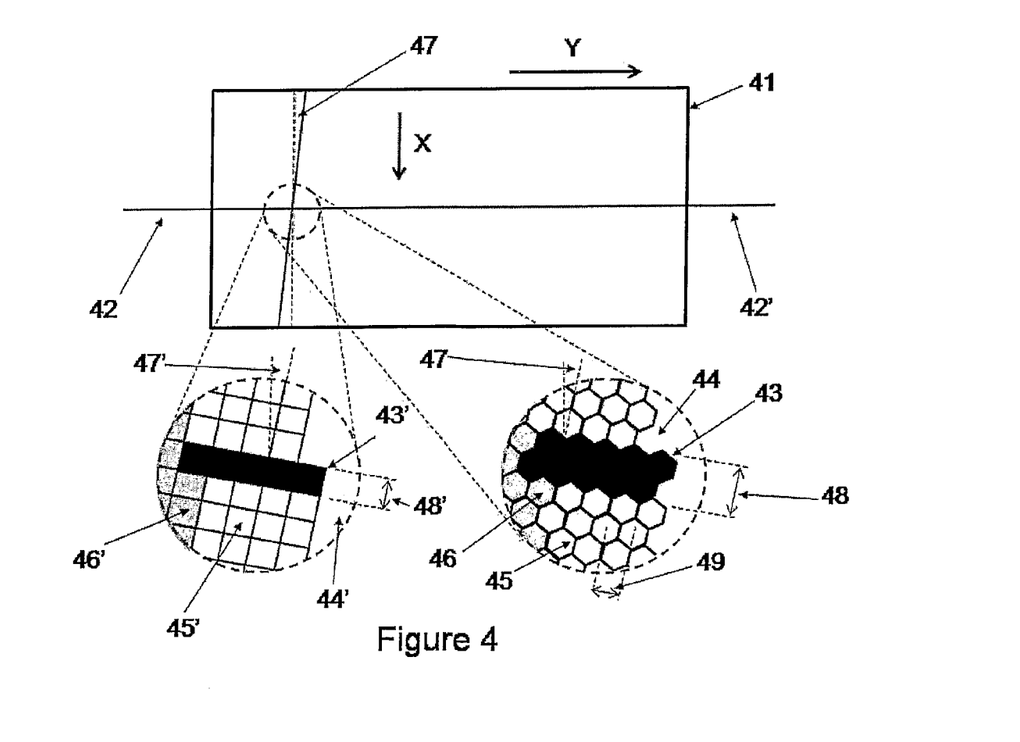
FIG. 4 shows details of image patterns of microstructures formed on the drum surface.

FIG. 4 illustrates how the rectangular image on the surface of the drum is aligned at a small angle to the drum axis in order to enable an exact helical process path to be executed. Drum 41 is mounted on axis 42, 42' and rotated in a direction such that the surface is moving continuously from top to bottom in the figure in the X direction. The optical projection system has its axis directed into the page in the figure and creates an image on the drum surface. The whole optical system is moving continuously from left to right in the Y direction in order to cover the drum surface. Two enlarged views of the image field of the projection lens on the drum surface are shown. In the case shown in the right hand image 43, an hexagonally shaped and packed array is being processed. In the case shown in the left hand image 43', a square array of microstructures is being processed. In both cases, an image with a length of only 5 microstructures is shown for simplicity. The enlarged views of the image show, in both cases, 3 different areas: an unprocessed area 44, 44' that has not been exposed to any laser pulses, an area 45, 45' where the microstructures have been exposed to one, two or three laser pulses and hence are partially formed and an area 46, 46' where the microstructures have been exposed to all the features in the image on the mask and hence are fully formed. To form a continuous helical path over the whole drum surface, the line image is tilted by a small angle 47 with respect to the drum axis. This angle is defined such that after one complete rotation of the drum the image is offset by one microstructure repeat pitch in the Y direction and hence is given by the ratio of the microstructure repeat pitch to the drum circumference. For clarity, the figure shows an exaggerated image tilt angle but in practice this angle is very small. The tilt of the image at the drum surface is achieved in practice by rotating the mask by the required angle. The accuracy of setting of this angle depends on the micro structure size and depth as well as the drum diameter but only becomes significant for the largest and deepest structures where the length of the line image at the drum surface is longest. The beam width depends on the microstructure array geometry. For the hexagonally packed array, the beam width 48 is the array repeat pitch in the direction orthogonal to the drum axis and so includes two adjacent lines of structures as shown. The array repeat pitch in the direction parallel to the drum axis 49 defines the incremental movement of the image in direction Y for each drum revolution. For the square array case, the beam width and the incremental Y movement of the image for each drum revolution are both simply the microstructure width.

FIG. 5

Figure 5:
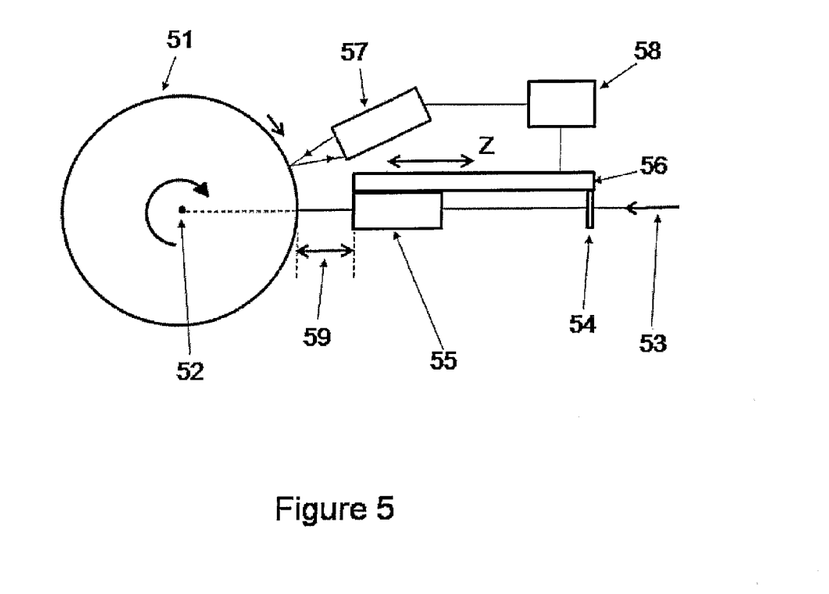
FIG. 5 shows schematic view of a method for maintaining the image in focus on the drum surface.

FIG. 5 shows an example of an apparatus that can be used to ensure that the image created by the projection system remains in focus on the drum surface even if the drum varies in diameter, is not perfectly circular or is mounted eccentrically on its axle. A cylindrical drum 51 is mounted on an axis 52 which forms the axis about which it rotates. In the figure, the drum 51 is shown rotating in a clockwise direction. A beam from laser 53, having passed via a homogenizer and mirrors as required, arrives at the mask 54. A lens 55 creates a reduced image of the mask 54 on the surface of the drum 51. The mask 54 and lens 55 are both attached to a carriage on a servo motor driven stage 56 so that both items move together along the Z direction which is parallel to the projection system optical axis and perpendicular to the drum surface.

The stage that supports the carriage holding both the lens 55 and the mask 54 is itself attached to second carriage on which the homogenizer is mounted. This second carriage is driven by a second servo motor driven stage which has a direction of motion parallel to the drum axis 52. This second stage, which is not shown in the figure, has the function of moving the projection system and associated homogenizer along the length of the drum 51. An optical sensor unit 57 is attached to the second carriage so that it moves down the length of the drum 51 with the projection optics.

The sensor 57 is mounted such that it measures the relative distance from the sensor 57 to the drum surface at a position on the surface that is about to be exposed to laser pulses. The distance data generated by the sensor 57 is processed by controller 58 and used to drive the servo motor on the projection system stage in order to maintain the distance from the lens 55 to the drum surface at the process point constant so that the image of the mask 54 is always in focus. For this application, the drum 51 is expected to be made with some precision so, as it rotates and the optical projection system traverses the full length of the drum 51, variations in the surface location and hence movement of the projection optics in the Z direction are expected to be small (eg less than 1 mm). This means that the distance from the mask 54 to the homogenizer unit, which is not mounted on the same carriage as the mask 54, is also varying by a small amount during processing. This small variation in distance has negligible effect on the shape or uniformity of the beam formed at the mask 54.

FIG. 6

Figure 6:
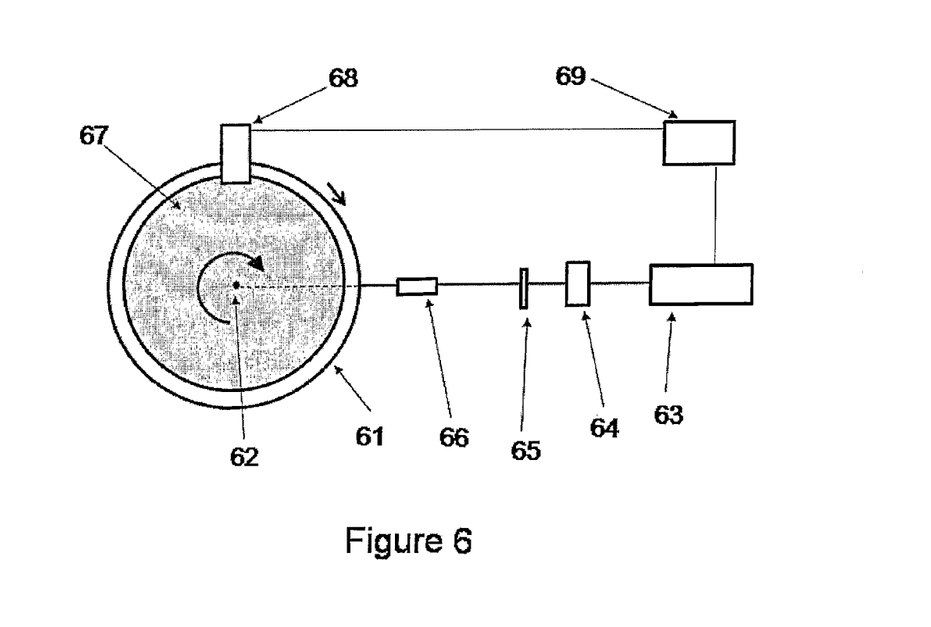
FIG. 6 shows schematic view of a method for triggering the laser pulses.

FIG. 6 shows an example of apparatus that can be used to control the firing of the laser so that the microstructures formed on the surface of the drum are a perfect 2D array with no discontinuities. Drum 61 is mounted on axis 62 and rotated about this axis in a clockwise direction in the figure. The beam from the laser 63 is passed through homogenizer 64 to a mask 65. Projection lens 66 creates an image of the mask 65 on the surface on the drum 61 at the instant that the laser 63 is triggered to cause it to emit a pulse. It is important that an exact integral number of complete microstructures and hence laser pulses are fitted into each complete revolution of the drum 61 so that an accurate method for triggering the laser 63 with respect to the rotation of the drum 61 is required. This is achieved by attaching a high resolution rotary encoder 67 to the drum axle and using an optical read head 68 to record the angular position of the drum 61 at all times. The output of the optical read head 68 is processed by control unit 69 which generates signal to fire the laser 61 at the correct angular position. The requirement on the angular resolution of the rotary encoder 67 used is determined by the microstructure size and the drum diameter and is most extreme for the smallest microstructures and the largest drum diameters. As an example, consider the case of 10 μm microstructures machined on the surface of a drum 61 of diameter 500 mm. The requirement to fit an exact number of microstructures in each revolution of the drum 61 means that the encoder 67, readout and data processing system needs to have a spatial resolution at the drum surface that is at least one order, and preferably two orders, of magnitude less than the microstructure size. For 10 μm microstructures this means a spatial resolution at the drum surface of 0.1 μm which translates, for a 500 mm diameter drum 61, into an angular resolution of 0.2 μrads. Such encoders 67 are commercially available from many suppliers.

FIG. 7

Figure 7:
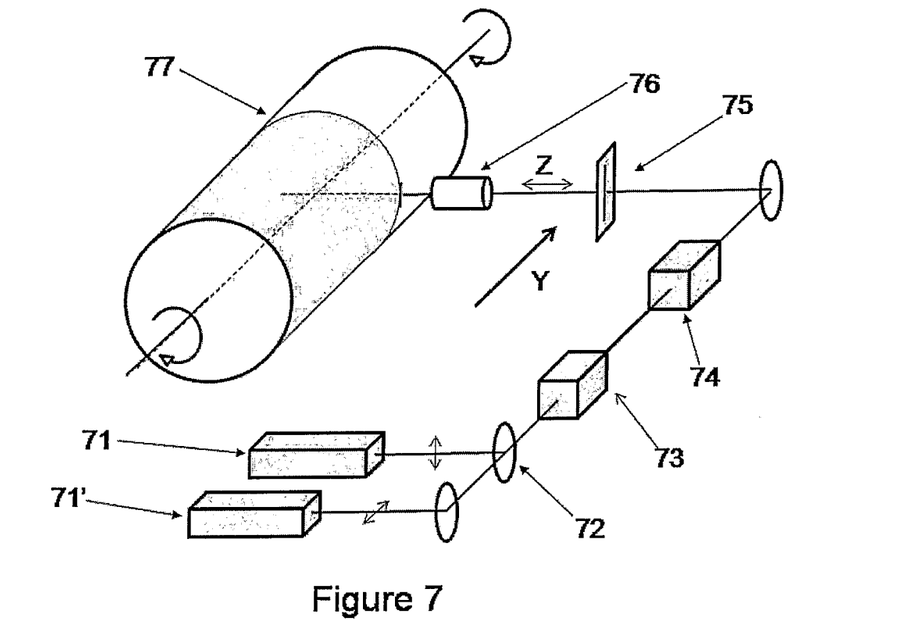
FIG. 7 shows a schematic view of a drum processing apparatus using 2 lasers.

FIG. 7 shows an apparatus that is similar to that shown in FIG. 3 but in this case two lasers 71, 71' of the same wavelength that have a low number of beam modes and hence have significant coherence are used. The two lasers 71, 71' are arranged to generate beams with different polarization. Laser 71 is shown to produce a vertically polarized beam whereas laser 71' is horizontally polarized. The two beams are combined at a polarizing mirror 72. This mirror has a dielectric coating that preferentially reflects vertically polarized radiation and preferentially transmits horizontally polarized radiation. By suitable angular and spatial adjustments of the beams from the lasers 71, 71', the two combined beams after the polarizing mirror 72 can be arranged to be perfectly angularly and spatially coincident. Since in this case the beams are coherent, it is necessary to pass them through a mode scrambler unit 73 before passing to the rest of the optical system which includes the usual homogenizer 74, mask 75 and lens 76 before impinging on the drum 77. As with FIG. 3, the lens 76 and mask 75 are able to move in the Z direction for focusing purposes while the lens 76, mask 75 and homogenizer 74 move in the Y direction to cover the length of the drum 77. In this case, where the lasers 71, 71' are stationary and the distance between them and the homogenizer 74 is changing, it is desirable that the mode scrambler 73 is also mounted on the same carriage as the homogenizer 74 so that it moves with it. Since the beams from the lasers 71, 71' have a limited number of modes, changes in the separation between them and the mode scrambler 73 are unlikely to be significant in terms of beam size change whereas variations in the separation between the mode scrambler 73 and the homogenizer 74 are likely to lead to more significant beam size variations due to the increased beam divergence. The lasers 71, 71' could also be mounted on the same carriage as the mode scrambler 73, homogenizer 74 and projection system if required. Alternatively, the complete optical system could be held stationary and the drum 77 moved over its full length. In the figure, the line image on the drum surface is shown to be aligned close to perpendicular to the axis of rotation of the drum 77 but alignment close to parallel to the drum axis is also possible The invention described above thus provides a method for exposing the full area of the surface of a rotating, cylindrical drum in one continuous helical path to patterned illumination from a pulsed laser source at a suitable energy density in order to cause ablation of the surface to form arrays of individually symmetric or asymmetric repeating 3D microstructures with arbitrary packing density without seam lines or discontinuities, comprising the steps of:

a. generating pulses of radiation by means of a laser;

b. homogenizing, shaping and modifying the laser beam to form a single rectangular, line shaped beam with flat top energy density profile in the long axis;

c. arranging a mask to have a rectangular shape with a long axis and a short axis;

d. arranging on the long axis of the mask one or two lines of features on a fixed pitch corresponding to the pitch of the microstructures in that direction where the features in each line correspond to different depth contours of the 3D microstructures and all the features defining one complete microstructure are included in one line on the mask in that direction;

e. arranging on the short axis of the mask a sufficient number of features to correspond to the minimum single repeat pitch of the microstructure array in that direction.

f. locating the mask relative to a projection lens;

g. passing the uniform rectangular line shaped laser beam through the mask such that all the features defining the microstructure depth profile are situated in the laser beam;

h. by means of the projection lens projecting a de-magnified line beam image made up of all of the features on the mask onto a target area;

i. accurately locating the surface of a cylindrical drum in the target area;

j. accurately positioning the laser beam optical axis passing through the centre of the projection lens to pass through the axis of rotation of the drum and be perpendicular to the axis of rotation of the drum such that the laser beam impinging on the drum is normal to the drum surface;

k. rotating the drum continuously about its axis;

l. moving the lens and mask unit together continuously with respect to the drum in a direction parallel to the axis of rotation of the drum such that after each complete rotation of the drum the lens and mask unit have moved a distance equal to the repeat pitch of the microstructure array in the direction parallel to the axis of rotation of the drum;

m. controlling the triggering of the pulsed laser in relation to the exact angular position of the rotating drum such that laser pulses occur whenever the target area at the drum surface has moved a distance very close to one repeat microstructure unit pitch distance of the array in the direction of rotation such that an exact multiple number of the microstructure repeat units fit into the full circumferential helical path around the drum after each full revolution; and n. controlling the distance of the lens and mask unit from the surface of the drum so that the image of the mask is always in focus even if the drum surface is not perfectly flat.

The invention described above also provides a unit for ablating the surface of a polymer coated drum to form a dense, regular array of 3D microstructures by patterned illumination comprising:

o. a pulsed laser source;

p. a mask containing a single line of features on a fixed pitch that represent all the different depth contours in a single microstructure and disposed between the laser source and a target area;

q. an illumination system for creating a uniform rectangular, line shaped laser beam that exposes the complete single line of the features on the mask and disposed between the laser source and the mask;

r. an optical projection system that uses a lens that is fixed in position with respect to the mask to de-magnify the mask image onto the target area and disposed between the mask and the target area;

s. a rotation stage and motor system for rotating the drum about its axis so that the surface of the drum moves in the target area;

t. a linear stage and motor system that causes the lens and mask unit to move continuously together in the direction parallel to the axis of rotation of the drum and over the full length of the drum;

u. a linear stage and motor system that causes the lens and mask unit to move in the direction perpendicular to the surface of the drum;

v. a sensor and control system that moves the lens and mask unit in the direction perpendicular to the drum surface to maintain constant spacing between the lens and the drum surface; and w. a control system that links the firing of the pulsed laser to the exact angular position of the drum.

The invention claimed is:

1. A method for exposing a surface of a cylindrical drum in a continuous helical path to illumination from a pulsed laser source to cause ablation of the surface so as to form an array of repeating 3D microstructures thereon, the method comprising:

generating pulses of radiation using a laser;

providing a mask of rectangular shape with a first axis and a second axis, the mask having a plurality of features arranged on a fixed pitch in a line parallel to the first axis thereof corresponding or proportional to the pitch of the 3D microstructures to be formed, the features in the line corresponding to different depth contours of the 3D microstructure which together define a complete microstructure;

locating the mask relative to a projection lens with the first axis thereof substantially parallel to the axis of rotation of the drum and the second axis thereof substantially parallel to the direction of rotation of the drum;

exposing the mask to the rectangular shaped laser beam such that all the features thereof are exposed by the laser beam;

projecting an image comprising the plurality of features on the mask through the projection lens onto a target area of the drum surface;

rotating the drum about its axis;

moving the projection lens and mask with respect to the drum in a direction substantially parallel to the axis of rotation thereof such that after each complete rotation of the drum the projection lens and mask have moved a distance equal to said fixed pitch of the microstructure array in the direction parallel to the axis of rotation of the drum whereby said plurality of features are successively exposed onto the same target area to form the different depth profiles of the microstructure; and controlling the timing of the laser pulses in relation to an angular position of the rotating drum such that laser pulses occur whenever the target area on the drum surface has moved a distance corresponding to a repeat distance of the array of microstructures in the direction of rotation such that a whole number of the microstructure repeat distances fit into a helical path around the drum in each revolution thereof, wherein a width, in the direction of rotation of the drum, of the image projected onto the target area of the drum surface by each exposure of the mask to the rectangular shaped laser beam is less than or equal to a minimum repeat pitch of the array of microstructures in the direction of rotation, and a length, in a direction perpendicular to the direction of rotation, of the image is greater than or equal to twice the minimum repeat pitch of the array of microstructures in the direction perpendicular to the direction of rotation.

2. The method as in claim 1, wherein a first, long axis of a rectangularly shaped beam image on the drum surface is positioned at a predetermined angle with respect to a line parallel to the axis of rotation of the drum, the predetermined angle being defined by said pitch of the 3D microstructure in the direction parallel to the axis of rotation divided by the circumference of the drum.

3. The method as in claim 1, wherein a first long axis of a rectangularly shaped laser beam image on the drum surface is positioned at a predetermined angle with respect to a line perpendicular to the axis of rotation of the drum, the predetermined angle being defined by said pitch of the 3D microstructure in the direction parallel to the axis of rotation divided by the circumference of the drum.

4. The method as in claim 1, wherein the laser is a solid state laser that emits a beam having a single transverse mode and an optical mode scrambler unit is used to increase the number of modes in the beam so as to create a beam having a low degree of spatial coherence.

5. The method as in claim 1, wherein the laser is a solid state laser that emits a beam having a low number of transverse modes and an optical mode scrambler unit is used to increase the number of modes in the beam so as to create a beam having a low degree of spatial coherence.

6. The method as in claim 1, wherein the laser is a solid state laser that emits a beam with a sufficiently large number of transverse modes so as to have a low degree of spatial coherence without the need to use an optical mode scrambler unit.

7. The method as in claim 1, wherein generating pulses of radiation using a laser comprises generating pulses of radiation using more than one laser and combining beams generated by the more than one laser to form a single rectangular laser beam at the mask.

8. The method as in claim 1, wherein the array of microstructures created on the drum surface are packed in a square or rectangular geometry.

9. The method as in claim 1, wherein the array of microstructures created on the drum surface are packed in a hexagonal geometry.

10. An apparatus for ablating a surface of a rotating, cylindrical drum to form an array of repeating 3D microstructures thereon, the apparatus comprising:
a pulsed laser source;
a mask comprising a plurality of features arranged in a line on a fixed pitch, the features in the line corresponding to different depth contours of the 3D microstructure;
an illumination system for providing a rectangular shaped laser beam for exposing the line of features on the mask;
an optical projection system for projecting an image of the mask onto a target area of the drum surface;
a rotation device for rotating the drum about its axis;
a stage and motor system for moving the optical projection system and mask in a direction parallel to the axis of rotation of the drum such that after each complete revolution of the drum the projection system and mask have moved a distance equal to said fixed pitch of the microstructure array; and
a control system for controlling the timing of the laser pulses in relation to an angular position of the drum such that laser pulses occur whenever the target area on the drum surface has moved a distance corresponding to a repeat distance of the array of microstructures in the direction of rotation, wherein the mask is located such that the line of features is substantially parallel to the axis of rotation of the drum,
wherein a width, in the direction of rotation of the drum, of the image projected onto the target area of the drum surface by each exposure of the mask to the rectangular shaped laser beam is less than or equal to a minimum repeat pitch of the array of microstructures in the direction of rotation, and a length, in a direction perpendicular to the direction of rotation, of the image is greater than or equal to twice the minimum repeat pitch of the array of microstructures in the direction perpendicular to the direction of rotation.

* * * * *